3,005,002
Patented Oct. 17, 1961

3,005,002
SULFAMOYLPHENYL ESTERS OF ORGANIC PHOSPHATES
Gerald Berkelhammer, Norwalk, Conn., assignor to American Cyanamid Company, New York, N.Y., a corporation of Maine
No Drawing. Filed Feb. 6, 1961, Ser. No. 87,090
12 Claims. (Cl. 260—461)

This invention relates to new organic compounds and more particularly is concerned with novel sulfamoylphenyl organic phosphates which may be represented by the following general formula:

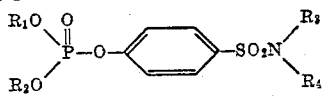

wherein $R_1$ and $R_2$ are lower alkyl radicals of from 1 to 4 carbon atoms, and $R_3$ and $R_4$ are hydrogen or lower alkyl radicals of from 1 to 6 carbon atoms.

The new compounds may be prepared by reacting an appropriate phosphorochloridate, e.g., dimethyl phosphorochloridate, with an appropriate sulfonamide, e.g., p-hydroxybenzenesulfonamide under alkaline conditions in the presence of a suitable polar solvent, e.g., water, acetone, methyl ethyl ketone, etc. at temperatures ranging from about 0° C. to about 100° C.

The invention will be described in greater detail in conjunction with the following specific examples.

EXAMPLE 1

*Diethyl p-sulfamoylphenyl phosphate*

A mixture of diethyl phosphorochloridate (17.2 g., 0.1 mole), p-hydroxybenzenesulfonamide (17.2 g., 0.1 mole), and sodium carbonate (10.6 g., 0.1 mole) in 100 milliliters of methyl ethyl ketone is heated under reflux for three hours, allowed to stand overnight at room temperature, and finally refluxed for five hours more. The solids are removed by filtration and the solvent evaporated from the filtrate under diminished pressure. The residual red oil is dissolved in 100 milliliters of methyl isobutyl ketone and the resultant solution washed three times with 25 milliliter portions of 10% sodium carbonate solution, followed by three washings with 25 milliliter portions of saturated aqueous sodium chloride. Drying over magnesium sulfate and removal of the solvent under vacuum leaves a yellow-white solid (17.1 g., 56%) M.P. 73.5–77.5°. Two recrystallizations from water give the analytical sample, M.P. 80–81°.

EXAMPLE 2

*Dimethyl p-sulfamoylphenyl phosphate*

Dimethyl phosphorochloridate (28.9 g., 0.2 mole), p-hydroxybenzenesulfonamide (34.6 g., 0.2 mole), and sodium carbonate (21 g., 0.2 mole) are heated under reflux in 200 milliliters of methyl ethyl ketone for one hour and then allowed to stand overnight at room temperature. The solids are removed by filtration and the solvent evaporated in vacuo. The residual brown oil is taken up in 150 milliliters of methyl isobutyl ketone and washed with three 25 milliliter portions of brine. Drying over magnesium sulfate followed by removing the solvent under diminished pressure leaves a brown oil (26.2 g., 46.5%). Chromatography on acid-washed alumina gives a solid, which when recrystallized from benzene-ethyl acetate melts at 85.5–87°.

EXAMPLE 3

*Dimethyl p-(isopropylsulfamoyl)phenyl phosphate*

Dimethyl phosphorochloridate (3.8 g., 0.025 mole), N-isopropyl-1-phenol-4-sulfonamide (5.4 g., 0.025 mole) and sodium carbonate (2.6 g., 0.025 mole) are refluxed in 50 milliliters of methyl ethyl ketone for five and three-quarter hours and allowed to stand overnight at room temperature. The solids are filtered from the mixture and the filtrate evaporated under reduced pressure, yielding a viscous brown oil (7.0 g., 86.5%). The oil is taken up in 75 milliliters of methyl isobutyl ketone, washed with 60 milliliters of 10% sodium bicarbonate solution and 60 milliliters of saturated sodium chloride solution. The ketonic solution is dried over magnesium sulfate and evaporated under reduced pressure, yielding a light brown oil (4.6 g., 57%). The oil is chromatographed on silica gel adsorbent, yielding a pale brown oil (4.1 g., 51%).

EXAMPLE 4

*Dimethyl p-(dimethylsulfamoyl)phenyl phosphate*

A mixture of dimethylphosphoryl chloride (8.7 g., 0.06 mole), N,N-dimethyl-1-phenol-4-sulfonamide (10.1 g., 0.05 mole) and sodium carbonate (5.3 g., 0.05 mole) in 100 milliliters of acetone is heated to reflux for four hours, cooled to room temperature and filtered. The solvent is removed from the filtrate under reduced pressure and the residual oil heated to 55° C./1.5 mm. for 30 minutes. The oil is taken up in chloroform, washed with potassium carbonate solution, then with water, the chloroform solution dried and the solvent evaporated. Adsorption chromatography of the residue on aluminum oxide yields 65% of pure product as a clear, colorless oil with $n_D^{25}=1.5119$.

EXAMPLE 5

*Diethyl p-(dimethylsulfamoyl)phenyl phosphate*

To a mixture of N,N-dimethyl-1-phenol-4-sulfonamide (20.1 g., 0.1 mole) and sodium carbonate (10.6 g., 0.1 mole) in 100 milliliters of acetone at 45–60° is added slowly 17.2 g., (0.1 mole) of diethyl phosphoryl chloride. The mixture is heated to reflux for 3.5 hours, cooled to room temperature and filtered. The solvent is removed from the filtrate under reduced pressure, the residual oil taken up in carbon tetrachloride, washed with sodium carbonate solution, then saturated sodium chloride solution, the organic layer dried and the solvent evaporated. Hexane extraction and filtering of the oil yields the purified product with $n_D^{25}=1.4998$.

Other compounds of this invention may be similarly made; for example, the reaction between diethyl phosphorochloridate and N-ethyl-1-phenol-4-sulfonamide gives diethyl p-(ethylsulfamoyl)phenyl phosphate. In like manner, N-methyl-1-phenol-4-sulfonamide with dimethyl phosphorochloridate give the corresponding phosphates. Diisopropyl phosphorochloridate with 1-phenol-4-sulfonamide gives diisopropyl p-sulfamoylphenyl phosphate.

The compounds of the present invention are highly active insecticides either by contact or by systemic action. They may be used as sprays in organic solvents, as emulsions in water or other non-solvents, or on solid carriers such as talcs, clays, diatomaceous earths and the like. The insecticidal activity of the compounds of the present invention in controlling various insects is illustrated as follows:

*Nasturtium aphid.*—100% kill with the compounds of Examples 1 to 5, inclusive, at a concentration of 0.01% in a solvent carrier consisting of 65% acetone and 35% water.

*German cockroach.*—95 to 100% kill with the compounds of Examples 1 to 5, inclusive, at a concentration of 1.0% on solid carriers such as fuller's earth and attapulgus clay.

*Milkweed bug.*—90 to 100% kill with the compounds of Examples 1 to 5, inclusive, at a concentration of 1% on solid carriers such as pyrophyllite and attapulgus clay.

*Southern armyworm.*—100% kill with the compounds of Examples 2 to 5, inclusive, at a concentration of 0.1% in a solvent carrier consisting of 65% acetone and 35% water. The compound of Example 2 exhibited a 100% kill at a concentration of 0.01% in a solvent carrier consisting of 65% acetone and 35% water.

The systemic activity of the compounds of the present invention is illustrated as follows:

Young Sieva lima bean plants infested with two-spotted spider mites, *Tetranychus telarius*, are cut at ground level and inserted into an aqueous emulsion or solution of the test compound. The test is set up with ventilation in a manner to prevent toxic action by other than translocation, and counts are made after three days. The compounds of Examples 1 and 2 gave from 90 to 100% kill of the mites at a concentration of 100 p.p.m. in a solvent carrier consisting of 1 percent acetone and 99 percent water.

This application is a continuation-in-part of application Serial No. 817,081, filed June 1, 1959.

1. A compound of the formula:

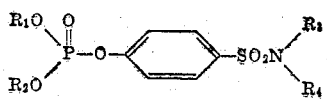

wherein $R_1$ and $R_2$ are lower alkyl radicals of from 1 to 4 carbon atoms, and $R_3$ and $R_4$ are members of the group consisting of hydrogen and lower alkyl radicals.

2. Diethyl p-sulfamoylphenyl phosphate.
3. Dimethyl p-sulfamoylphenyl phosphate.
4. Dimethyl-p-(isopropylsulfamoyl)phenyl phosphate.
5. Dimethyl p-(dimethylsulfamoyl)phenyl phosphate.
6. Diethyl p-(dimethylsulfamoyl)phenyl phosphate.
7. The method of preparing a compound of the formula:

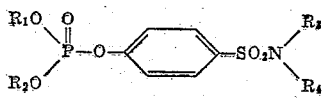

wherein $R_1$ and $R_2$ are lower alkyl radicals of from 1 to 4 carbon atoms, and $R_3$ and $R_4$ are members of the group consisting of hydrogen and lower alkyl radicals which comprises reacting a di-lower alkyl phosphorochloridate with a member of the group consisting of p-hydroxybenzenesulfonamide and N-isopropyl-1-phenol-4-sulfonamide at a temperature of from 0° C. to 100° C., said reaction being conducted in an inert polar solvent and in the presence of an alkaline acid binding agent.

8. The method of preparing diethyl p-sulfamoylphenyl phosphate which comprises reacting diethyl phosphorochloridate with p-hydroxybenzenesulfonamide at a temperature of from 0° C. to 100° C., said reaction being conducted in an inert polar solvent and in the presence of an alkaline acid binding agent.

9. The method of preparing dimethyl p-sulfamoylphenyl phosphate which comprises reacting dimethyl phosphorochloridate with p-hydroxybenzenesulfonamide at a temperature of from 0° C. to 100° C., said reaction being conducted in an inert polar solvent and in the presence of an alkaline acid binding agent.

10. The method of preparing dimethyl p-(isopropylsulfamoyl)phenyl phosphate which comprises reacting dimethyl phosphorochloridate with N-isopropyl-1-phenol-4-sulfonamide at a temperature of from 0° C. to 100° C., said reaction being conducted in an inert polar solvent and in the presence of an alkaline acid binding agent.

11. The method of preparing dimethyl p-(dimethylsulfamoyl)phenyl phosphate which comprises reacting dimethyl phosphorochloridate with N,N-dimethyl-1-phenol-4-sulfonamide at a temperature of from 0° C. to 100° C., said reaction being conducted in an inert polar solvent and in the presence of an alkaline acid binding agent.

12. The method of preparing dimethyl p-(dimethylsulfamoyl)phenyl phosphate which comprises reacting diethyl phosphorochloridate with N,N-dimethyl-1-phenol-4-sulfonamide at a temperature of from 0° C. to 100° C., said reaction being conducted in an inert polar solvent and in the presence of an alkaline acid binding agent.

No references cited.